United States Patent [19]

Fitzpatrick et al.

[11] 4,174,226
[45] Nov. 13, 1979

[54] REFRACTORY MIX COMPOSITION AND METHOD OF PREPARATION

[75] Inventors: Thomas H. Fitzpatrick, Martinez, Ga.; James E. Williamson, Jr., Belvedere, S.C.; Walter H. Alexanderson, Augusta, Ga.

[73] Assignee: The Babcock & Wilcox Company, New York, N.Y.

[21] Appl. No.: 950,958

[22] Filed: Oct. 13, 1978

Related U.S. Application Data

[63] Continuation of Ser. No. 833,627, Sep. 15, 1977, abandoned.

[51] Int. Cl.$^2$ .............................................. C04B 35/02
[52] U.S. Cl. ........................................ 106/64; 106/65; 106/67; 106/85; 106/104; 206/204; 366/1
[58] Field of Search ............................. 106/64, 65, 104; 423/309

[56] References Cited

U.S. PATENT DOCUMENTS

| | | | |
|---|---|---|---|
| 2,619,426 | 11/1952 | Greger | 106/64 X |
| 2,852,401 | 9/1958 | Hansen | 106/65 |

FOREIGN PATENT DOCUMENTS

| | | | |
|---|---|---|---|
| 2292682 | 6/1976 | France | 106/65 |
| 828749 | 2/1960 | United Kingdom | 106/65 |

OTHER PUBLICATIONS

Grott, G. J., "Phosphate Bonded Refractories for Specialty Applications", *Proceedings of Electric Furnace Conference*, 1959, 17, pp. 391-395.

Schlack, A. V.-Phosphoric Acid-vol. 1, Part II, (1968), pub. Marcel Dekker, Inc., N.Y., pp. 972 and pp. 990-993.

*Primary Examiner*—Helen M. McCarthy
*Attorney, Agent, or Firm*—Joseph M. Maguire; Angelo Notaro

[57] ABSTRACT

The invention relates to an alumina based, phosphate bondable, dry refractory mix composition exhibiting an extended shelf life of up to eighteen months and longer. The mixture has the following preferred composition on a weight percentage basis: 40-70% sized tabular alumina, 15-35% calcined alumina, 2-10% hydrated alumina, 1-10% calcium aluminate cement and an acid ingredient such as 3 to 15 weight percent of an 115 percent concentration of polyphosphoric acid. The mix is prepared by a method which comprises the steps of formulating dry ingredients into a mixer, mixing the dry ingredients to a homogenous state, then adding a liquid acid ingredient to the mixture of dry ingredients, and subjecting the dry and acid ingredient mix to a high intensity mixing action for a predetermined period of time. The product is substantially dry to the touch.

6 Claims, No Drawings

REFRACTORY MIX COMPOSITION AND METHOD OF PREPARATION

This is a continuation of application Ser. No. 833,627 filed Sept. 15, 1977, now abandoned.

BACKGROUND OF THE INVENTION

The present invention generally relates to dry refractory mix compositions and the method of preparing the same, and more particularly, to a single package phosphate bondable dry refractory mix composition, and a high intensity mixing process for preparing the mix.

The term "refractory specialty" has often been used to refer to a broad class of unconsolidated refractories, i.e. not in preformed shapes such as molded brick. Refractory specialties are typically utilized in monolithic refractory constructions wherein the refractory is installed in situ and forms an integral jointless structure. Many refractory specialties are popularly produced, packaged, and shipped as mixes—blends of materials proportioned in a definite manner. These mixes may be produced and shipped in a substantially wet or plastic condition for use without further treatment, in a dry state requiring liquid tempering and mixing, or as a two package (one dry, one wet) system requiring intermixing of the package components with or without the addition of a liquid prior to the use of the mix. Thus, refractory specialty mixes used for monolithic refractory construction may be further distinguished and classified, in either of two ways, by the condition in which they are shipped, e.g., plastic, dry, and wet, or moreover, by the techniques by which they are applied, e.g., ramming, gunning, casting and troweling, or both. Wet refractories are substantially wet to the touch and, conversely, dry refractories are substantially dry to the touch.

Plastic refractories are refractory materials, generally tempered with water into a stiff plastic condition having a desired consistency, that can be extruded and that have suitable workability for use in forming a monolithic structure without further preparation. Plastic refractories are often rammed into place.

Ramming mixes, by definition, consist essentially of ground and sized refractory aggregates, with amounts of other materials added to promote workability and bonding, that cannot be extruded but have suitable properties to permit ramming into place to form a monolithic structure. Hence, ramming mixes are usually shipped in a wet state and further liquid addition is not required for the application technique.

A castable, in contrast, is defined as a combination of refractory grain and suitable bonding agent that, after the addition of a proper liquid, is generally poured into place to form a refractory shape or structure which becomes rigid due to chemical action. Castables are generally cast or gunned into place.

Refractory mix compositions which utilize high percentages of various inert refractory aggregates, especially alumina, and which include phosphoric acid or phosphates are known in the art. When phosphoric acid or acid phosphate salts are used to generate a chemical bond premature hardening and loss of workability is often encountered and limits the shelf life of the mixes. The premature uncontrolled presetting of these phosphate bondable mixes is believed to be caused by a series of complex chemical reactions between the phosphate ingredients and the alumina bearing materials in the mix.

Presently, there are phosphate bondable refractory mix products marketed as a two package (each having multiple ingredients) system. A typical two package product includes a package having damp mix ingredients containing tabular alumina and an equilibrium mixture of phosphoric based acid, and a package of dry mix ingredients containing tabular alumina, calcined alumina, hydrated alumina and a calcium aluminate cement. Blending of the ingredients of the two packages with the addition of water to achieve a desired consistency initiates setting of the mixture. Because the damp and dry packages cannot be intermixed until a short time before the mix is to be applied, each package must be separately produced, packed and maintained. The shelf life of the damp package, moreover, is limited in time due to reactions of its constituent acid and alumina. Such reactions are accelerated if the damp component package is contaminated, poorly sealed or exposed to excessive heat. The limited shelf life of the damp component package can result in warehousing or production scheduling problems or both. Use of a two package mix also exposes the placement operation to the possibility of errors, e.g., in weighing and mixing the components, which can result in an inferior product and wastage, and increased preparation time of the user. Clearly, a single package mix having an extended shelf life can lead to improved economies.

Techniques for extending the shelf life of single or two package phosphate bondable preparations generally encompass use of a sequestering agent or inhibitor to retard premature reaction between the alumina and phosphoric acid. U.S. Pat. No. 3,622,360, for example, discloses an alumina-phosphoric acid ramming mix composition. The ramming mix of U.S. Pat. No. 3,622,360 is described as having an extended shelf life and prolonged workability specifically due to the addition of an inhibitor selected from the group consisting of nitrilotriacetic acid and ethylenediaminetetracetic acid which promote the age retardation of the mix. The ramming mix described is tempered with water to achieve a desired plasticity.

U.S. Pat. No. 3,197,315 discloses the formulation and use of a typical high alumina content wet refractory composition, packed in suitable paper containers for shipment, utilizing 85% phosphoric acid. The alumina particles, as an additional requirement, are precoated with heated fatty acids such as palmitic or stearic acids or mixtures thereof to produce a lubricated, free-flowing gunning composition. The composition disclosed therein also contains amounts of boric acid used as a binder in conjunction with the phosphoric acid. The addition of small amounts of boric acid in such a composition is known to retard alumina-phosphoric acid reactions. The composition is prepared by heating the fatty acid mixture components to above the melting point of the fatty acid mixture which is added to a premixed batch of the remaining ingredients for intermixing of the entire blend.

U.S. Pat. No. 3,303,034 teaches a plastic refractory mixture with phosphoric acid and aluminous material from the group consisting of tabular alumina, bauxite, kyanite and diaspore that is disclosed as suitable for installation by ramming techniques after storage periods of up to six months. The improved storage shelf life is attributed to the presence of bentonite as a plasticizer which is less reactive with the phosphoric acid than the previously used plasticizers.

U.S. Pat. No. 2,852,401 teaches high temperature phosphate bondable refractory compositions in the form of unconsolidated particles that are substantially dry to the touch. The compositions of U.S. Pat. No. 2,852,401 are formed by incorporating phosphoric acid in a refractory batch having a major proportion of refractory aggregate and a minor proportion of aluminous material that is chemically reactive with phosphoric acid at room temperature, followed by drying of the mixture at a temperature not in excess of about 125° F. Hence, the refractory aggregate must be sufficiently inert that it does not, upon the addition of the acid, produce sufficient heat of reaction to bring the batch temperature above the critical 125° F. upon which the desirable properties of the disclosed compositions depend.

Prior art techniques for preparation of the two component mixes typically rely on a thorough mixing of each component separately. At the time of use, the components are intermixed with water and again subjected to further mixing.

Thus, the development of a dry alumina based, phosphate bondable single package refractory mix composition which exhibits extended shelf life, which does not require an inhibitor is highly desirable. Moreover, a simplified process of preparing such a composition which eliminates necessary prior art process steps for preparing the mix such as drying or precoating aluminous materials with combinations of fatty acid under controlled conditions offers further attraction.

SUMMARY OF THE INVENTION

The inventive composition is a single package dry refractory mix exhibiting substantially improved shelf life under conventional storage conditions and having properties that compare favorably to the prior art two package mixes. The preferred inventive composition comprises a mixture of tabular alumina, calcined alumina, hydrated alumina, calcium aluminate cement and an acid ingredient such as 3 to 19 weight percent of an 85 percent concentration of phosphoric acid or 3 to 15 weight percent of 115 percent polyphosphoric acid.

The preferred mix is prepared by formulating a mixture of the dry ingredients in a mixer, mixing the dry ingredients to a homogeneous state, introducing the liquid acid component into the homogenous mixture of dry ingredients, and subjecting the entire mass to a high intensity mixing step for a selected period of time to produce a single component refractory mix substantially dry to the touch with a highly dispersed acid phase within the intermixed mass. The resulting mix is characterized as a dry single package alumina based, phosphate bondable refractory mix composition having an extended shelf life.

The various features of novelty which characterize the invention are pointed out with particularity in the claims annexed to and forming a part of this specification. For a better understanding of the invention, its operating advantages and specific objects obtained by its use, reference should be had to the accompanying descriptive matter in which there is described a preferred embodiment of the invention.

DESCRIPTION OF THE PREFERRED EMBODIMENTS

The present inventive composition, as noted above, may be described as a dry alumina based, phosphate bondable refractory mix composition that has particular utility for installation by refractory ramming, gunning and troweling techniques. It is generally of the variety of chemically set refractory specialties that are heated subsequent to their application. The preferred composition contains graded tabular alumina, calcined alumina, hydrated alumina, a calcium aluminate cement and a dispersed phosphoric acid. The individual ingredients are mixed within certain compositional ranges, described hereinafter, to produce a dry single component mix composition characterized by an extended shelf life which is remarkably longer than current competitive products, and having comparable modulus of rupture, cold crushing strength, abrasion resistance and percent linear dimensional changes.

All size grading or mesh indications herein are according to the standard Tyler series.

A wide variety of materials is suited for use as inert (not active in causing the primary bonding reaction to occur) refractory aggregate in the practice of this invention. These include tabular alumina, calcined bauxite, kaolin calcine, and synthetic mullite. Use of a particular aggregate, or combination of two or more aggregates, as well as particle size grading will depend upon the particular application technique and the desired properties of the monolithic structure to be formed. Tabular alumina is preferred because of its high refractoriness and resistance to abrasion.

Tabular alumina is a relatively pure form of sintered calcined alumina containing trace amounts of $SiO_2$, $Fe_2O_3$ and $Na_2O$. This form of alumina has well-developed alpha alumina crystals with a Mohs hardness scale reading of 9. For use in accordance with the invention, particles larger than 6 mesh generally have a negative influence on the workability characteristics of the resulting mix. Hence, the tabular alumina aggregate should be all ground to $-6$ mesh in order to obtain desirable particle packing. Tabular alumina is generally commercially available in sizes larger than 100 mesh but such aggregate sized at $-100$ mesh would be suitable. An appropriate tabular alumina is produced and marketed by the Aluminum Company of America ("Alcoa") under the designation of Tabular Alumina T-61. The other sources of aggregate may be used in place of the tabular alumina with selection of the size of the substitute aggregate based on availability and end use.

The calcined alumina preferred is sized as all minus 100 mesh. This alumina phase is characterized by a fine crystal size, less than 5 microns and displays comparatively little shrinkage. A suitable commercially available calcined alumina is produced by Alcoa and marketed as Calcined Alumina A-2. Calcined bauxite or kaolin calcine could be substituted.

A reactive alumina compound such as hydrated alumina is used, in conjunction with the proper distribution of diphosphorous pentaoxide in an acid, to generate one of the necessary bonding agents. Hydrated alumina is a white crystalline substance granular in nature generally designated as $Al(OH)_3$. The refined form generally contains small amounts (less than 1%) of $SiO_2$, $Fe_2O_3$ and $Na_2O$. Hydrated Alumina C-31 produced by Alcoa is a suitable commercially available material for use herein. Common impure bauxite which is naturally hydrated is also satisfactory for the purposes of the present composition. It has been found that the hydrated alumina ingredient size significantly influences the working time and set of the mix. Shorter working times are associated with the finer forms of equivalent weights of alumina hydrate in that the finer grades expose more surface for the reaction.

Calcium aluminate cements are compositions having monocalcium aluminate ($CaO.Al_2O_3$) as their major constituent. Refcon, a shock sintered, pelletized calcium aluminate cement manufactured by Universal Atlas Cement Division of United States Steel Corporation has been found to give satisfactory performance in the present inventive composition as one of the binding agents for the refractory aggregates heretofore described. Refcon is supplied as a ground powder. Selection of a refractory cement binder, as well as selection of the aggregate, requires attention be paid to the temperature requirements of the final refractory product. Where temperatures approaching 3000° F. are expected, appropriate commercial replacement for Refcon may be made.

Polyphosphoric acid (PPA), as an anhydrous supersaturated solution containing $P_2O_5$ distributed as orthophosphoric acid and condensed acids is the preferred $P_2O_5$ derived acid ingredient. PPA has strong dehydrating properties and has found various applications for its catalytic and sequestering abilities. A typical composition of polyphosphoric acid produced by the FMC Corporation, Philadelphia, Pa. and used to successfully prepare an inventive refractory mix described herein is listed in Table I.

TABLE I

| Concentration, % $H_3PO_4$ | 115 |
|---|---|
| Viscosity at 25° C. centipoise | 28,000 |
| Viscosity at 100° C. centipoise | 510 |
| Composition | |
| $P_2O_5$, % | 83.2 |
| $P_2O_5$ Distribution as | |
| orthophosphoric acid, % | 5 |
| pyrophosphoric acid, % | 16 |
| triphosphoric acid, % | 17 |
| tetraphosphoric acid, % | 16 |
| higher polymer acids, % | 46 |

Due to the high viscosity of PPA at lower temperatures it is preferred, but not required, to utilize the PPA within the temperature range of 160° F. to 200° F. to facilitate addition to the dry ingredients as described hereinafter.

It has been found that the preparation of the mix using the method described hereinafter permits replacement of the PPA with 85% phosphoric acid. This finding is unexpected in view of the fact that an inhibitor is not required as in the prior art. Although a product having extended shelf life is formed when the PPA is replaced with 85% phosphoric acid, the mechanical properties of the products using PPA appear to be superior for particular industrial applications such as in petroleum catalytic crackers, where high abrasion resistance is required.

Although the physiochemical nature of the bond produced is not completely understood, it is believed that phosphoric acid readily reacts with hydrated alumina to form hydrated aluminum phosphate in the presence of water and is responsible, in conjunction with the cementing reaction of the calcium aluminate cement, for the mixture setting. In the inventive composition, PPA and phosphoric acid provide the phosphate constituent needed to ultimately form the aluminum phosphate bond, but while the properly conditioned mix is maintained in a dry condition, the dispersion of the acid precludes bond formation.

The inventive mixture has a broad and preferred compositional makeup within the ranges shown in Table II as follows:

TABLE II

| COMPONENT | BROAD RANGE (w/o*) | PREFERRED RANGE (w/o*) |
|---|---|---|
| Tabular Alumina | 40-70 | 50-60 |
| Calcined Alumina | 15-35 | 22-32 |
| Hydrated Alumina | 2-10 | 2-6 |
| Calcium Aluminate Cement | 1-10 | 1-5 |
| Acid Ingredient | 3-19(35% $H_3PO_4$) | 5-9(85% $H_3PO_4$) |

*w/o - Weight Percent

Hydrated alumina present in amounts exceeding ten weight percent promotes bloating of the refractory when wet, making it undesirable for use as a ramming mix. Difficulty in setting occurs when the mix contains less than two percent hydrated alumina.

The presence of calcium aluminate cement between zero and one percent also retards setting of the mix upon application. However, with amounts of calcium aluminate cement greater than ten percent, the mixture will tend to flash set, making it extremely difficult to apply to a surface and work into place.

It has further been found that the PPA, the preferred acid ingredient, must be present within the range of 3-15% for the mix to develop the necessary setting properties when water is added. However, PPA in amounts in excess of 15%, especially in the presence of a high calcium aluminate cement content, will cause flash setting of the mixture adversely affecting the workability of the mix. In this regard, the upper limit of 15% PPA is critical in producing a phosphate bonded ramming mix with commercially acceptable characteristics. When 85% phosphoric acid is utilized, the upper limit becomes 19%. Shrinkage of products made from amounts greater than 19% would be unacceptably high.

The balance of the materials used to form the mix, viz., tabular alumina and calcined alumina, in the preferred embodiment, are adjusted as is known in the art to provide suitable workability and the like.

At the point of use, a sufficient amount of water is added to the mix to obtain the consistency required for the application technique, e.g. ramming, gunning or slap troweling, to be utilized for the particular mix. The binder system of the preferred embodiment is considered to comprise the phosphate components, the hydrated alumina and a calcium aluminate cement. The complex series of reactions and physiochemical nature of the resulting bond is not completely understood. However, the reactions are highly exothermic and the final bond is characterized as an aluminate phosphate bond. No subsequent heating or curing of the bond is required, hence the bonding is essentially cold setting. It has been found that the desirable characteristics achieved by the mix are not present in the absence of calcium aluminate cement which is apparently essential to the highly exothermic nature of the bonding reactions. Hence, the presence of calcium aluminate cement is deemed critical. The use of calcium aluminate cement in conjunction with the other components of the binder system, moreover, results in a mix yielding a monolithic refractory construction which has advantges over conventional calcium aluminate cement construction in that superior properties are obtained in the 100° F. to 2000° F. temperature range.

The method of producing the mix comprises formulating the dry (non-acid) ingredients in a blending pot followed by mixing thereof to a homogeneous state. It is not critical to achieve homogenity of the dry components prior to adding the acid. PPA is then added in an amount such that the composition makeup falls within the above disclosed ranges for each of the ingredients. The mixture is then subjected to a high intensity mixing step for a selected period of time which will vary based on the batch size to be made. It is critical to production of the improved product mix that the mixing operation be characterized as high intensity as described hereafter. While the exact reason for this is not understood, it is believed that high intensity mixing action shatters and disperses the acid droplets allowing the acid to be coated by alumina fines. This coating and separation of the acid particles, it is believed, prevents their reaction, inhibiting the aluminum phosphate and cement hydration reactions which cause the mixture to set. The resulting mix, moreover, is substantially dry to the touch although the acid ingredient was added as a liquid.

No suitable technique for determining degree of dispersion of the acid in the mixture is available, however, a suitable degree of dispersion can be predicted by reference to a "specific mixing energy" or specific energy input into a batch preparation expressed in kilowatts per hundred kilograms of batch.

In preparation of the inventive composition a specific mixing energy with the range of approximately 0.4 to approximately 1.4 kilowatts per hundred kilograms has been found necessary to produce a satisfactory product with an extended shelf life. However, a time variable has been found to be critical as regards a successful mix, this variable appearing in the form of mechanical work on the mix. The work on the mix is defined as the product of the power(amps—operating current less free load current—multiplied by rated voltage of the mixer motor) and the mixing time. Once the appropriate specific mixing energy values are obtained, total mixing time of from 1 to 4 minutes will insure a satisfactory product with a 2.5 minute mixing time for the acid blended mixture being an optimum time value.

The term "high intensity mixing", in the specification and claims, is intended to denote mixing with a specific mixing energy of 0.4 to 1.4 kilowatts per hundred kilograms of batch ingredients.

The preferred method of preparation of the composition is to formulate the dry ingredients in a mixing pot and mix these to a homogenous state. The acid is then added to the blended dry ingredient mixture. The entire mass is then mixed for a predetermined period of time, not exceeding four minutes.

The sequence in Example 1 of starting the mixer at a slower speed and subsequently increasing the speed is not critical to the process and is merely a characteristic of the control arrangement on the particular equipment utilized. Rotation of the mixer pan, as described in Example 1 is likewise not critical to the process but is a characteristic of the particular mixer. It is not necessary, moreover, to stop the mixer prior to adding the acid ingredients. Alternatively, the dry and acid ingredients may be concurrently charged into the mixer.

The invention will be better understood upon reference to Examples 1 and 2 which follow:

EXAMPLE 1

Two hundred-twenty-eight (228) pounds of −6 M/F (minus 6 mesh to finer) T-61 tabular alumina was added to the pan of an Eirich Model DE 14 counter-current intensive mixer which was equipped with a suction type rotor. Four hundred-sixty-eight (468) pounds of −14 M/F T-61 alumina, along with thirty-six (36) pounds of Refcon cement were also added to the pan. Fifty (50) pounds of −200 mesh raw Dutch Guiana bauxite, a hydrate, and one hundred seventy-seven (177) pounds of −325 M Alcoa A-2 Alumina along with one hundred fifty-six (156) pounds of −325 M coarse removed A-2 alumina were also added to the mixer pan. The mixer was then started and operated at a rotor speed of 880 rpm and quickly increased to a rotor speed of 1760 rpm. Rotor rotation was counter-clockwise and the mixer pan rotation clockwise. The mixer pan was rotated for 60 seconds before the mixer was stopped. Eighty-four (84) pounds of 115% polyphosphoric acid (PPA) was then added. The mixer was then energized with a rotor speed of 880 rpm and quickly increased to 1760 rpm with the rotor rotating in a counter-clockwise direction and the pan rotating in a clockwise direction for 90 seconds. The mixer was then stopped and the material from the pan bagged in polyethylene lined paper bags. The bags were sealed and stored. Eighteen (18) months later, the samples were unbagged. The material flowed freely out of the bags and no lumps were observed.

The material was placed with 6% water and formed into test samples measuring 2"×2"×9". The material had a working time of approximately 20 minutes. Each sample was permitted to air set overnight, dried at 220° F. for 24 hours, and fired to the temperature indicated (Table III) for a five hour period. Upon being cooled to ambient, the samples exhibited the properties listed in Table III.

EXAMPLE 2

A mix was formulated having the following composition:

| | |
|---|---|
| -6M/F tabular alumina | 93.5 lbs. |
| -14M/F tabular alumina | 191.5 lbs. |
| -325 M, calcined alumina | 136.5 lbs. |
| Hydrated alumina | 20.5 lbs. |
| Calcium Aluminate Cement | 14.5 lbs. |
| Phosphoric Acid (855) | 43.5 lbs. |

The procedure utilized involved adding the dry ingredients to the mixer pan of an Eirich Model DE-12 counter-current mixer, mixing the batch for about 35 seconds at 1008 rpm, adding the acid to the batch without stopping the mixer and mixing for an additional 150 seconds. Samples were formed and tested using the methods described under Example 1. The results are reported in Table III. The mix was then bagged in polyethylene paper bags, sealed and stored for 71 days. The mix was subsequently examined and found to be loose with lumps which broke up upon mixing. The mix was cast with 7½% water and had a working time of approximately 15 minutes. Table III lists the measured properties of the sample.

TABLE III

| | Example 1 | Example 2 |
|---|---|---|
| Bulk Density, p.c.f., After — | | |
| Air drying for 24 hours at 220° F. | 165 | 160 |

TABLE III-continued

|  | Example 1 | Example 2 |
|---|---|---|
| Fired at 1500° F. | 164 | 157 |
| Fired at 2800° F. | 171 | — |
| Fired at 3000° F. | — | 173 |
| Modulus of Rupture, p.s.i. After — | | |
| Air Drying for 24 hours at 220° F. | 2110 | 2170 |
| Fired at 1500° F. | 1700 | 1610 |
| Fired at 2800° F. | 2640 | — |
| Fired at 3000° F. | — | −300 |
| Cold Crushing Strength, p.s.i. After — | | |
| Air Drying for 24 Hours at 220° F. | 4520 | — |
| Fired at 1500° F. | 3440 | — |
| Fired at 2800° F. | 3550 | — |
| Fired at 3000° F. | — | — |
| Abrasion Loss*, c.c., After — | | |
| Air Drying for 24 Hours at 220° F. | .36 | — |
| Fired at 1500° F. | .45 | — |
| Fired at 2800° F. | .24 | — |
| Fired at 3000° F. | — | — |
| Linear Change after Firing, percent | | |
| At 1500° F. | 0.0 | −0.2 |
| At 2800° F. | −0.9 | — |
| At 3000° F. | — | −3.5 |

*Abrasion Loss Measured Per Silica Sand method.

The average specific mixing energy in Examples 1 and 2 were 1.05 and 0.6 kilowatts per hundred kilograms respectively.

As noted above, high intensity mixing is critical to the production of an improved product mixture. Example 3 illustrates the contrasting results attained when a mix was prepared utilizing a low speed non-intensive mixing technique:

EXAMPLE 3

The following components in the corresponding amounts were added to a standard pan muller mixer:

| Components | Amount (lbs) |
|---|---|
| -6M/F, tabular alumina | 191 |
| -14M/F, tabular alumina | 330 |
| -325M, calcined alumina | 278 |
| Hydrated alumina | 42 |
| Calcium Aluminate Cement | 30 |

The above components were dry mixed in the muller mixer for 3 minutes while the mixer operated an approximately 30 rpm. Sixty-nine (69) pounds of 115% PPA was added on a continuous basis while the mix was dry mixing. When all the acid had been added, the components were mixed for at least five (5) minutes or until the mix was well blended. The mixer was then stopped, unlocked and the material bagged in polyethylene lined paper bags for storage. The mix was not substantially dry to the touch but had a damp feel. Within one (1) week the composition had set and hardened.

In the following Examples 4–6, three additional compositions using ingredients, as shown, are detailed. Each mix was formed by charging the dry ingredients into an Eirich Model DE-12 counter-current mixer, mixing the batch for about 35 seconds at 1008 rpm, adding the acid to the batch without stopping the mixer and mixing for an additional 150 seconds. Samples were formed as in Example 1 by casting the mixes of Examples 4, 5 and 6 with 6.6%, 6.4% and 8% water, and were tested. The results are reported in Tables IV and V.

EXAMPLE 4

| Components | Weight Percent |
|---|---|
| -6 M/F Calcined Bauxite | 19.0 |
| -14 M/F Calcined Bauxite | 39.0 |
| -325 M/F Calcined Alumina | 27.8 |
| Hydrated Alumina (Alcoa C-331) | 4.2 |
| Calcium Aluminate Cement | 3.0 |
| 115% Polyphosphoric Acid | 7.0 |

EXAMPLE 5

| Components | Weight Percent |
|---|---|
| -6 M/F Calcined Bauxite | 19.0 |
| -14 M/F Calcined Bauxite | 39.0 |
| -325 M/F Calcined Alumina | 27.8 |
| Hydrated Alumina (Alcoa C-31) | 4.2 |
| Calcium Aluminate Cement | 3.0 |
| 115% Polyphosphoric Acid | 7.0 |

EXAMPLE 6

| Components | Weight Percent |
|---|---|
| -8 M/F Kaolin Calcine | 33.5 |
| -6 M/F Kaolin Calcine | 13.7 |
| -325 M/F Calcined Alumina | 35.8 |
| Hydrated Alumina | 5.4 |
| Calcium Aluminate Cement | 3.9 |
| 115% Polyphosphoric Acid | 7.7 |

TABLE IV

|  | Example 4 | Example 5 |
|---|---|---|
| Bulk Density, p.c.f., After — | | |
| Air drying for 24 hours at 220° F. | 167 | 165 |
| Fired at 1500° F. | 164 | 160 |
| Fired at 2800° F. | 178 | — |
| Fired at 2900° F. | 182 | 173 |
| Modulus of Rupture, p.s.i. After — | | |
| Air Drying for 24 hours at 220° F. | 2000 | 1520 |
| Fired at 1500° F. | 1430 | 1210 |
| Fired at 2800° F. | 5100 | — |
| Fired at 2900° F. | 5260 | 3710 |
| Cold Crushing Strength, p.s.i. After — | | |
| Air Drying for 24 Hours at 220° F. | 5300 | 2730 |
| Fired at 1500° F. | 4590 | 2630 |
| Fired at 2800° F. | 9590 | — |
| Fired at 2900° F. | 9700 | 7760 |
| Abrasion Loss*, c.c., After — | | |
| Air Drying for 24 Hours at 2200° F. | 6.6–9.4 | — |
| Fired at 1500° F. | 6.7–7.1 | 9.0 |
| Linear Change after Firing, percent | | |
| At 1500° F. | −0.2 | +0.1 |
| At 2800° F. | −2.8 | — |
| At 2900° F. | −2.6 | −2.5 |

*Abrasion Loss Measured Per ASTM Standard C 704, Standard Method of Test for Abrasion Resistance of Refractory Materials at Room Temperature.

TABLE V

|  | Example 6 |
|---|---|
| Bulk Density, p.c.f., After — | |
| Air drying for 24 hours at 220° F. | 145 |
| Fired at 1500° F. | 141 |
| Fired at 2800° F. | 147 |
| Fired at 3000° F. | 143 |
| Modulus of Rupture, p.s.i. After — | |
| Air drying for 24 hours at 220° F. | 1580 |
| Fired at 1500° F. | 1130 |
| Fired at 2800° F. | 3000 |
| Fired at 3000° F. | 4030 |
| Cold Crushing Strength, p.s.i. After — | |

TABLE V-continued

|  | Example 6 |
| --- | --- |
| Air drying for 24 Hours at 220° F. | 3390 |
| Fired at 1500° F. | 3040 |
| Fired at 2800° F. | 7210 |
| Fired at 3000° F. | — |
| Abrasion Loss*, c.c., After — |  |
| Air drying for 24 hours at 220° F. | 12.5 |
| Fired at 1500° F. | 13.8 |
| Linear Change after Firing, percent |  |
| At 1500° F. | 0.0 |
| At 2800° F. | −1.9 |
| At 3000° F. | −0.4 |

*Abrasion Loss Measured Per ASTM Standard C 704, Standard Method of Test for Abrasion Resistance of Refractory Materials at Room Temperature.

The embodiments of the invention in which an exclusive claim or privilege is claimed are defined as follows:

1. A single package, dry refractory mix, which exhibits extended shelf life under conventional storage conditions and does not require an inhibitor, which sets upon the addition of water, and which exhibits high abrasion resistance when set, consisting essentially of:
   (a) 40 to 70 weight percent of an inert refractory aggregate,
   (b) 15 to 35 weight percent of an aluminous material selected from the group consisting of calcined alumina, calcined bauxite and kaolin calcine,
   (c) 2 to 10 weight percent hydrated alumina,
   (d) 1 to 10 weight percent calcium aluminate cement, and
   (e) 3 to 15 weight percent of 115 percent polyphosphoric acid;

prepared by a process comprising the steps of introducing the dry ingredients into a mixer, mixing the dry ingredients, adding the acid ingredient to the mixture of dry ingredients, and subjecting the dry and acid ingredient mix to a high intensity mixing action for a predetermined period of time, not exceeding four minutes.

2. A single package, dry refractory mix, which exhibits extended shelf life under conventional storage conditions and does not require an inhibitor, which sets upon the addition of water, and which exhibits high abrasion resistance when set, consisting essentially of
   (a) 40 to 70 weight percent of an inert refractory aggregate selected from the group consisting of tabular alumina, calcined bauxite, kaolin calcine and synthetic mullite,
   (b) 15 to 35 weight percent of an aluminous material selected from the group consisting of calcined alumina, calcined bauxite and kaolin calcine,
   (c) 2 to 10 weight percent hydrated alumina,
   (d) 1 to 10 weight percent calcium aluminate cement, and
   (e) 3 to 15 weight percent of 115 percent polyphosphoric acid;

prepared by a process comprising the steps of introducing the dry ingredients into a mixer, mixing the dry ingredients, adding the acid ingredient to the mixture of dry ingredients, and subjecting the dry and acid ingredient mix to a high intensity mixing action for a predetermined period of time, not exceeding four minutes.

3. A single package, dry refractory mix, which exhibits extended shelf life under conventional storage conditions and does not require an inhibitor, which sets upon the addition of water, and which exhibits high abrasion resistance when set, consisting essentially of:
   (a) 50 to 60 weight percent of an inert refractory aggregate,
   (b) 22 to 32 weight percent of an aluminous material selected from the group consisting of calcined alumina, calcined bauxite and kaolin calcine,
   (c) 2 to 6 weight percent of hydrated alumina,
   (d) 1 to 5 weight percent of calcium aluminate cement, and
   (e) 3 to 15 weight percent of 115 percent polyphosphoric acid;

prepared by a process comprising the steps of introducing the dry ingredients into a mixer, mixing the dry ingredients, adding the acid ingredient to the mixture of dry ingregients, and subjecting the dry and acid ingredient mix to a high intensity mixing action for a predetermined period of time, not exceeding four minutes.

4. A single package, dry refractory mix, which exhibits extended shelf life under conventional storage conditions and does not require an inhibitor, which sets upon the addition of water and which exhibits high abrasion resistance when set, consisting essentially of:
   (a) 50 to 60 weight percent of an inert refractory aggregate selected from the group consisting of tabular alumina, calcined bauxite, kaolin calcine and synthetic mullite,
   (b) 22 to 32 weight percent of an aluminous material selected from the group consisting of calcined alumina, calcined bauxite and kaolin calcine,
   (c) 2 to 6 weight percent of hydrated alumina,
   (d) 1 to 5 weight percent of calcium aluminate cement, and
   (e) 3 to 15 weight percent of 115 percent polyphosphoric acid;

prepared by a process comprising the steps of introducing the dry ingredients into a mixer, mixing the dry ingredients, adding the acid ingredient to the mixture of dry ingredients, and subjecting the dry and acid ingredient mix to a high intensity mixing action for a predetermined period of time, not exceeding four minutes.

5. The product of claim 1 or 2 or 3 or 4 wherein the predetermined period of time is between one minute and four minutes.

6. The product of claim 5 wherein the predetermined period of time is 2.5 minutes.

* * * * *

UNITED STATES PATENT AND TRADEMARK OFFICE
CERTIFICATE OF CORRECTION

PATENT NO. : 4,174,226
DATED : November 13, 1979
INVENTOR(S) : Thomas H. Fitzpatrick, James E. Williamson, Jr., Walter H. Alexanderson It is certified that error appears in the above-identified patent and that said Letters Patent are hereby corrected as shown below:

Column 6, line 17, delete "3-19(35% $H_3PO_4$)" and insert -- 3-19(85% $H_3PO_4$) --

Column 7, line 3, delete "100°" and insert -- 1000° --

Column 8, line 48 delete "(855)" and insert -- (85%) --

Column 9, line 11 delete "-300" and insert -- 4300 --

Column 9, line 42 delete "330" and insert -- 390 --

Signed and Sealed this

Seventeenth Day of June 1980

[SEAL]

Attest:

SIDNEY A. DIAMOND

Attesting Officer

Commissioner of Patents and Trademarks